(12) United States Patent
Maeda

(10) Patent No.: US 8,331,910 B2
(45) Date of Patent: Dec. 11, 2012

(54) ACCESS AUTHORITY CHANGING METHOD, CORE NETWORK APPARATUS, BASE STATION, AND TERMINAL

(75) Inventor: Masaya Maeda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/380,909

(22) PCT Filed: Jul. 2, 2009

(86) PCT No.: PCT/JP2009/062116
§ 371 (c)(1),
(2), (4) Date: Dec. 27, 2011

(87) PCT Pub. No.: WO2011/001526
PCT Pub. Date: Jan. 6, 2011

(65) Prior Publication Data
US 2012/0100834 A1    Apr. 26, 2012

(51) Int. Cl.
*H04M 1/66* (2006.01)
(52) U.S. Cl. ......... 455/411; 455/410; 455/418; 370/328
(58) Field of Classification Search .................. 455/411, 455/410, 418; 370/328
See application file for complete search history.

(56) References Cited

U.S. PATENT DOCUMENTS

| | | | | |
|---|---|---|---|---|
| 6,498,934 | B1 * | 12/2002 | Muller | 455/450 |
| 2005/0232292 | A1 * | 10/2005 | Richards et al. | 370/432 |
| 2009/0176490 | A1 * | 7/2009 | Kazmi et al. | 455/434 |
| 2009/0318144 | A1 * | 12/2009 | Thomas et al. | 455/434 |
| 2010/0046470 | A1 * | 2/2010 | Sekiya | 370/331 |
| 2010/0210257 | A1 * | 8/2010 | Ogai et al. | 455/422.1 |

(Continued)

FOREIGN PATENT DOCUMENTS

JP    2003 319455    7/2003

(Continued)

OTHER PUBLICATIONS

3GPP TS 36.300 V8.7.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release8)," pp. 137-139, (Dec. 2008).

(Continued)

*Primary Examiner* — Danh Le
(74) *Attorney, Agent, or Firm* — Oblon, Spivak, McClelland, Maier & Neustadt, L.L.P.

(57) ABSTRACT

An access authority changing method in a cellular system including terminals, a core network apparatus, and base stations included in a cell connectable to a terminal permitted to make access, the core network apparatus storing a first list listing cells accessible by the terminals and the terminals storing a second list listing cells the terminals can access. The base station notifies the core network apparatus that the base station permits access of the terminal; the core network apparatus, receiving the notification, adds a cell of the base station to the first list and transmits the first list added with the cell to the base station; the base station broadcasts the received first list to the cell; and the terminal adds, based on contents of the received first list, a cell of the base station to the second list, accesses the cell, and starts communication with the core network apparatus.

12 Claims, 4 Drawing Sheets

U.S. PATENT DOCUMENTS

2010/0273448 A1 10/2010 Iwamura et al.
2011/0211339 A1* 9/2011 Hung et al. .................... 362/184
2011/0226493 A1* 9/2011 Blau et al. ....................... 169/11

FOREIGN PATENT DOCUMENTS

| JP | 2003 274449 | 9/2003 |
| JP | 2009 124671 | 6/2009 |
| WO | 2009 057602 | 5/2009 |

OTHER PUBLICATIONS

3GPP TR 24.801 V8.1.0, "3$^{rd}$ Generation Partnership Project; Technical Specification Group Core Network and Terminals; 3GPP System Architecture Evolution; CT WG1 Aspects (Release 8)," pp. 90-94, (Dec. 2008).

International Search Report Issued Sep. 29, 2009 in PCT/JP09/62116 Filed Jul. 2, 2009.

* cited by examiner

| TERMINAL | WHITE LIST |
|---|---|
| 1 | 21 |
| 2 | 31 |
| 3 | 31 |

FIG.3

| TERMINAL | WHITE LIST |
|---|---|
| 1 | 21 |
| 2 | 21, 31 |
| 3 | 31 |

FIG.4

| NUMBER OF INFORMATION ELEMENTS (N) |
|---|
| ACCESS CONTROL UPDATE INFORMATION #1 TARGET CELL |
| ACCESS CONTROL UPDATE INFORMATION #1 NUMBER OF ACCESS-PERMITTED TERMINALS ($M_1$) |
| ACCESS CONTROL UPDATE INFORMATION #1 ACCESS-PERMITTED TERMINAL #1 |
| ACCESS CONTROL UPDATE INFORMATION #1 ACCESS-PERMITTED TERMINAL #2 |
| ... |
| ACCESS CONTROL UPDATE INFORMATION #1 ACCESS-PERMITTED TERMINAL #$M_1$ |
| ACCESS CONTROL UPDATE INFORMATION #2 TARGET CELL |
| ACCESS CONTROL UPDATE INFORMATION #2 NUMBER OF ACCESS-PERMITTED TERMINALS ($M_2$) |
| ACCESS CONTROL UPDATE INFORMATION #2 ACCESS-PERMITTED TERMINAL #1 |
| ACCESS CONTROL UPDATE INFORMATION #2 ACCESS-PERMITTED TERMINAL #2 |
| ... |
| ACCESS CONTROL UPDATE INFORMATION #2 ACCESS-PERMITTED TERMINAL #$M_2$ |
| ... |
| ACCESS CONTROL UPDATE INFORMATION #N TARGET CELL |
| ACCESS CONTROL UPDATE INFORMATION #N NUMBER OF ACCESS-PERMITTED TERMINALS ($M_N$) |
| ACCESS CONTROL UPDATE INFORMATION #N ACCESS-PERMITTED TERMINAL #1 |
| ACCESS CONTROL UPDATE INFORMATION #N ACCESS-PERMITTED TERMINAL #2 |
| ... |
| ACCESS CONTROL UPDATE INFORMATION #N ACCESS-PERMITTED TERMINAL #$M_N$ |

FIG.5

| NUMBER OF INFORMATION ELEMENTS (N): 1 |
|---|
| ACCESS CONTROL UPDATE INFORMATION #1<br>TARGET CELL: 21 |
| ACCESS CONTROL UPDATE INFORMATION #1<br>NUMBER OF ACCESS-PERMITTED TERMINALS ($M_1$): 1 |
| ACCESS CONTROL UPDATE INFORMATION #1<br>ACCESS-PERMITTED TERMINALS #1: 2 |

FIG.6

| NUMBER OF INFORMATION ELEMENTS (N): 1 |
|---|
| ACCESS CONTROL UPDATE INFORMATION #1<br>TARGET CELL: 21 |
| ACCESS CONTROL UPDATE INFORMATION #1<br>NUMBER OF ACCESS-PERMITTED TERMINALS ($M_1$): 0 |

ACCESS AUTHORITY CHANGING METHOD, CORE NETWORK APPARATUS, BASE STATION, AND TERMINAL

FIELD

The present invention relates to an access authority changing method that can dynamically change access authority to a CSG cell.

BACKGROUND

In the 3GPP (3rd Generation Partnership Project), it is determined to introduce the concept of a CSG (Closed Subscriber Group) cell, which mainly targets a base station for homes and to which only a specific user specified for each cell can make a connection, to a mobile communication system in the 3.9 generation and subsequent generations (LET: Long Term Evolution/SAE: Service Architecture Evolution). A mechanism for specifying an accessible user in each cell is standardized.

Specifically, a core network includes a white list obtained by listing cells accessible by terminals. Each of the terminals includes a white list obtained by listing cells accessible by the terminal. When a cell that the terminal attempts to access is a CSG cell, the terminal side determines, referring to the white list of the terminal, whether the cell is accessible and accesses the cell only when the cell is accessible. On the other hand, when the core network side receives a service request of a terminal from the CSG cell, the core network refers to the white list of the terminal, permits the start of a service only when the terminal has access authority to the CSG cell, and suspends the service and disconnects radio access of the terminal when the terminal does not have the access authority. The CSG cell can make, according to an instruction of an owner of a base station included in the CSG cell, a terminal not usually permitted to make access (a guest terminal) temporarily accessible and, on the contrary, make a terminal permitted to make access temporarily inaccessible. Such a technology is disclosed in Non-Patent Literatures 1 and 2.

CITATION LIST

Non Patent Literature

Non Patent Literature 1: 3GPP TS36.300, "Evolved Universal Terrestrial Radio Access (E-UTRA) and Evolved Universal Terrestrial Radio Access Network (E-UTRAN); Overall description; Stage 2 (Release 8)," V8.7.0 (2008 December)

Non Patent Literature 2: 3GPP TR24.801, "3GPP System Architecture Evolution (SAE); CT WG1 Aspects (Release 8)," V8.1.0 (2008 December)

SUMMARY

Technical Problem

However, according to the technology in the past explained above, in the 3GPP, a technology for dynamically changing access authority to the CSG cell is not specified. Therefore, there is a problem in that, when the access authority to the CSG cell is dynamically changed, it is likely that inconsistency temporarily occurs in the white lists on the terminal side and the core network side.

For example, it is assumed that an owner of a base station for homes instructs a core network to allow a specific guest terminal to temporarily access a cell of the base station for homes and the core network changes a white list of the guest terminal included in the core network to allow the guest terminal to access the cell of the base station for homes. In this case, the guest terminal cannot (does not attempt to) access the cell of the base station for homes unless the guest terminal changes a white list included in the guest terminal. Therefore, when there is no cell to which the guest terminal can make a connection other than the cell of the base station for homes, i.e., when there is no connection path from the guest terminal to the core network other than a path passing through the cell of the base station for homes, the core network cannot notify the guest terminal of update of the white list.

On the other hand, as a technology for avoiding a situation in which the core network cannot notify the guest terminal of update of the white list, for example, a method is conceivable in which a terminal of the owner of the base station for homes and the guest terminal perform direct communication using another kind of means such as short-range radio or a noncontact IC and the owner directly changes the white list of the guest terminal. However, in this method, the owner needs to instruct both the core network and the guest terminal to update the white lists. Access permission cannot be given when the owner is absent or before a visit of a guest. Therefore, there is a problem in that convenience is low.

The present invention has been devised in view of the above and it is an object of the present invention to obtain an access authority changing method that can dynamically change access authority to a CSG cell without causing inconsistency in white lists on a terminal side and a core network side.

Solution to Problem

In order to solve the above problem and in order to attain the above object, in an access authority changing method in a cellular system including at least one terminal, a core network apparatus, and a base station included in a cell to which only a terminal permitted to make access can be connected, the core network apparatus storing a first list, which is a white list obtained by listing cells accessible by terminals, and the terminals storing a second list, which is a white list obtained by listing cells to which the terminals can access, the access authority changing method of the present invention, includes: the base station notifying the core network apparatus that the base station permits access of a predetermined terminal not permitted to access a cell of the base station; the core network apparatus, which receives the notification, adding a cell of the base station to the first list as a cell to which the predetermined terminal can access; the core network apparatus transmitting the first list added with the cell to the base station; the base station transmitting the first list received from the core network apparatus to the cell in a broadcast manner; and the predetermined terminal adding, based on contents of the first list received from the base station, a cell of the base station to the second list, accessing the cell, and starting communication with the core network apparatus.

Advantageous Effects of Invention

The access authority changing method according to the present invention has an effect that inconsistency does not occur in the white lists on the terminal side and the core network side.

BRIEF DESCRIPTION OF DRAWINGS

FIG. 3 is a diagram of a configuration example of the white list after rewriting.

FIG. 4 is a diagram of a configuration example of access control update information.

FIG. 5 is a diagram of a configuration example of access control update information.

FIG. 6 is a diagram of a configuration example of access control update information.

DESCRIPTION OF EMBODIMENTS

Embodiments of an access authority changing method according to the present invention are explained in detail based on the drawings. The present invention is not limited by the embodiments.

First Embodiment

Figures 1, 2:
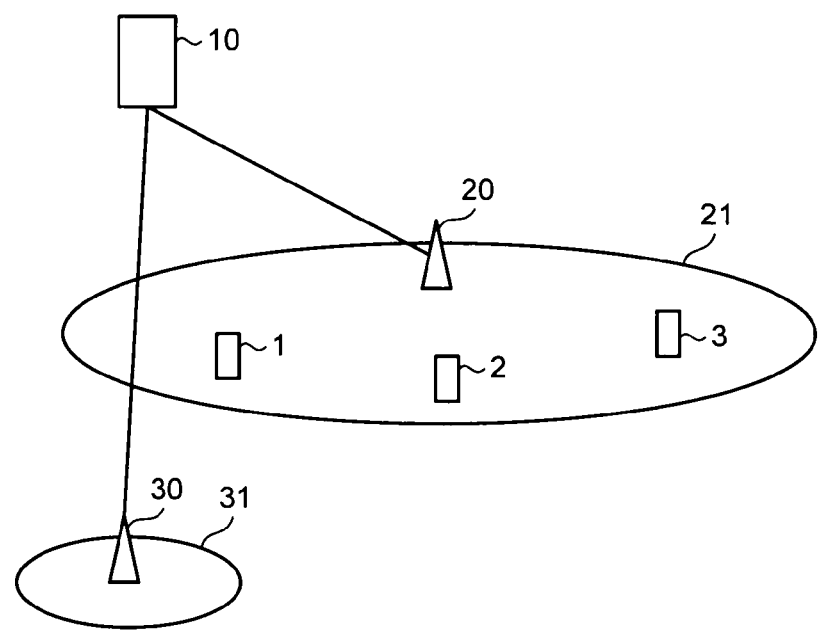
FIG. 1 is a diagram of a configuration example of a cellular system.
FIG. 2 is a diagram of a configuration example of a white list.

FIG. 1 is a diagram of a configuration example of a cellular system according to this embodiment. The cellular system includes terminals 1, 2, and 3, a core network apparatus 10, and base stations 20 and 30. Cells 21 and 31 respectively indicate communicable areas in the base stations 20 and 30. The terminals 1 to 3 are mobile terminals that perform communication with the core network apparatus 10 through the base station 20 or the base station 30. The network apparatus 10 makes a connection to the base station 20 and communicates with a terminal that is present in the cell 21 of the base station 20 and is in a communicable state. The core network 10 is connected to the base station 30 and communicates with a terminal that is present in the cell 31 of the base station 30 and is in a communicable state. The base stations 20 and 30 are base stations set in an indoor place where an outdoor radio wave less easily reaches such as a home. The cells 21 and 31 are CSG cells. It is assumed that radio waves from other stations do not reach in the cells 21 and 31.

As an initial state, the terminals 1, 2, and 3 are set in white lists of the core network apparatus 10 and the terminals 1 to 3 such that the terminal 1 is connectable in the cell 21 and the terminals 2 and 3 are connectable in the cell 31. FIG. 2 is a diagram of a configuration example of the white list included in the core network 10. The white list includes a pair of a terminal identifier and a list of CSG cells to which a terminal specified by the terminal identifier is connectable. Specifically, the white list indicates that the terminal 1 is accessible to the cell 21 and the terminals 2 and 3 are accessible to the cell 31. The white lists included in the terminals include only information concerning the own terminals among the contents shown in FIG. 2. For example, the white list of the terminal 1 includes only "21" and the white lists of the terminals 2 and 3 include only "31". When the terminals 1 to 3 include such white lists, the terminals 1 to 3 present in the cell 21 are in communication states explained below.

(Terminal 1)

The terminal 1 acquires a cell identifier from notification information notified in the cell 21 by the base station 20 and refers to the white list. Because the cell 21 is registered in the white list of the terminal 1, the terminal 1 determines that the cell 21 is accessible and performs position registration between the terminal 1 and the core network apparatus 10 through the base station 20 included in the cell 21. The core network apparatus 10 recognizes that the terminal 1 is present in the cell 21. Consequently, when there is an incoming call to the terminal 1, the core network apparatus 10 can notify the terminal 1 of the incoming call by transmitting a paging message to the cell 21. On the other hand, after completing the position registration, the terminal 1 changes to a waiting state in the cell 21, monitors the paging message transmitted from the core network apparatus 10 and, when necessary, can originate a paging message from the terminal 1 itself.

(Terminal 2)

Like the terminal 1, the terminal 2 acquires a cell identifier from notification information notified in the cell 21 by the base station 20 and refers to the white list. Because the cell 21 is not registered in the white list of the terminal 2, the terminal 2 determines that access is not permitted in the cell 21 and searches for another connectable cell without performing position registration between the terminal 2 and the core network apparatus 10 through the base station 20 included in the cell 21. Because radio waves from other base stations do not reach the cell 21, an alternative cell is not found and the terminal 2 is outside a communication range. Because a radio wave of the cell 21 reaches, the cell 21 can originate a radio wave. On the other hand, the core network apparatus 10 cannot specify the position of the terminal 2 because position registration from the terminal 2 is not performed. The core network apparatus 10 determines that the terminal 2 is present in a place where a radio wave does not reach or a power supply for the terminal 2 is off.

(Terminal 3)

A communication state is the same as that of the terminal 2.

A method of making, in the cell 21, the terminal 2 not permitted to make access temporarily accessible to the cell 21 is explained. First, an owner (not shown) of the base station 20 notifies the core network apparatus 10 that the terminal 2 is permitted to access the cell 21. For this notification, a general communication system in a cellular system is used. As a method of notification, for example, the owner makes a connection to a core network using a terminal of the owner and operates the terminal to perform registration or the owner calls a service center and performs registration according to operation by an operator. However, the method is not limited to these methods.

The core network apparatus 10 that receives the notification from the owner of the base station 20 rewrites the white list included in the core network apparatus 10 to enable the terminal 2 to access the cell 21. FIG. 3 is a diagram of a configuration example of the white list after the rewriting included in the core network apparatus 10. The cell 21 is added in the space of the terminal 2 as an accessible cell.

The core network apparatus 10 attempts to notify the terminal 2 of the change of the white list. However, the core network apparatus 10 cannot perform communication because the terminal 2 is in an out-of-range state. Therefore, the terminal 2 cannot rewrite the white list. Inconsistency occurs in the white lists between the terminal 2 and the core network apparatus 10. Therefore, first, the core network apparatus 10 transmits access control update information to the base station 20. FIG. 4 is a diagram of a configuration example of access control update information. The access control update information includes N information elements. Each of the N information elements corresponds to a base station cell set as a target of the access control update. Each of the information elements includes "target cell", "number of access-permitted terminals", and "access-permitted terminal". The information element indicates the number of terminals temporarily permitted to make access in a CSG cell corresponding to the information element and identifiers of the terminals.

Specifically, when a terminal temporarily permitted to make access is only the terminal 2 in the cell 21, the access control update information transmitted from the core network apparatus 10 is as shown in FIG. 5. FIG. 5 is a diagram of a configuration example of the access control update information. In the figure, the number of terminals permitted to make access is one and the terminal 2 is made temporarily accessible in the cell 21, which is a target cell.

The base station 20 extracts an identifier of a terminal temporarily permitted to make access in a cell corresponding to the base station 20 from the access control update information received from the core network 10 and transmits the identifier in a broadcast manner as notification information of the cell. In the base station 20, there is only the cell 21 as a cell in a communication area. For example, when the access control update information received from the core network apparatus 10 is access control update information shown in FIG. 5, it is described that the terminal 2 is temporarily permitted to make access in the cell 21. Therefore, the base station 20 includes an identifier of the terminal 2 in notification information of the cell 21. A list of identifiers of terminals temporarily permitted to make access in cells transmitted from the cells by base stations in a broadcast manner is a CSG cell white list. The terminals 1 to 3 present in the cell 21 change to communication states explained below according to the notification information of the cell 21.

(Terminal 1)

The terminal 1 is already in a communicable state in the cell 21 based on the white list included in the terminal 1. Therefore, the terminal 1 does not acquire the CSG cell white list generated according to the notification information from the cell 21.

(Terminal 2)

The terminal 2 acquires the CSG cell white list generated according to the notification information from the cell 21. Because the identifier of the terminal 2 is described in the CSG cell white list, the terminal 2 recognizes that the terminal 2 is temporarily permitted make access in the cell 21. Therefore, the terminal 2 rewrites contents of the white list (adds the cell 21). Like cells registered in the white list, the terminal 2 performs normal position registration between the terminal 2 and the core network apparatus 10 through the base station 20. Like the terminal 1, the terminal 2 changes to a communicable state.

(Terminal 3)

The terminal 3 acquires the CSG cell white list generated according to the notification information from the cell 21. However, because an identifier of the terminal 3 is not described in the CSG cell white list, the terminal 3 determines that the cell 21 is inaccessible and changes to the out-of-communication-range state again.

In this way, only the terminal 2 temporarily permitted to make access becomes connectable in the cell 21 anew. The terminal 2 can perform communication with the core network apparatus 10 through the base station 20.

A method of prohibiting, in the cell 21, access of the terminal 2 temporarily permitted to access the cell 21 is explained. First, the owner of the base station 20 notifies the core network apparatus 10 that the terminal 2 is prohibited from accessing the cell 21. When the core network apparatus 10 determines, according to a request from the owner of the base station 20, to prohibit the terminal 2 from accessing the cell 21, the core network apparatus 10 delete the cell 21 from a list of cells accessible by the terminal 2 in the white list of the core network apparatus 10. Consequently, the white list included in the core network apparatus 10 changes to the white list shown in FIG. 2 again.

Subsequently, the core network apparatus 10 transmits access control update information shown in FIG. 6 to the base station 20. FIG. 6 is a diagram of a configuration example of the access control update information. In FIG. 6, no terminal temporarily permitted to make access is present in the cell 21, which is the target cell. In other words, access of the terminal 2 temporarily permitted to make access is prohibited.

When the base station 20 receives the access control update information shown in FIG. 6, the base station 20 deletes the identifier of the terminal 2 from the CSG cell white list, which is a "list of temporarily accessible terminals", notified in the cell 21 (in the case of this embodiment, the list is empty).

After access authority to the terminal 2 is changed in the core network apparatus 10 and the base station 20, for example, the terminal 2 recognizes, through any one of methods (1) to (4) explained below, that access to the cell 21 is prohibited and changes to the out-of-communication-range state again in the cell 21.

(1) When the terminal 2 is performing communication, the core network apparatus 10 notifies, using a connection in communication, the terminal 2 that access is prohibited in the cell 21. After ending the communication, the terminal 2 changes to the out-of-communication-range state. The notification can be performed during the communication or can be performed when the communication ends. The core network apparatus 10 recognizes that the terminal 2 is out of range at a stage when the core network apparatus 10 notifies the terminal 2 that access is prohibited.

(2) When the terminal 2 is in a waiting state, the core network apparatus 10 calls the terminal 2 by paging through the base station 20. After the terminal 2 makes a connection to the core network apparatus 10 through the base station 20, as in (1), the core network apparatus 10 notifies, using the connection in communication, the terminal 2 that access is prohibited in the cell 21. Processing after this is the same as that in (1) explained above.

(3) When the terminal 2 is in the waiting state, the terminal 2 makes a connection to the core network apparatus 10 through the base station 20 for the position registration periodically performed by the terminal 2. Then, as in (1), the core network apparatus 10 notifies, using the connection in communication, the terminal 2 that access is prohibited in the cell 21. Processing after this is the same as that in (1) explained above.

(4) When the terminal 2 periodically acquires notification information and recognizes that the terminal 2 is deleted from the CSG cell white list, the terminal 2 makes a connection to the core network apparatus 10 through the base station 20 and performs processing for withdrawal from the cell 21. After the withdrawal processing, the terminal 2 is out of communication range. The core network apparatus 10 recognizes that the terminal 2 is out of communication range.

As an application of the method of prohibiting access of a terminal temporarily permitted to make access, it is also possible to prohibit access of the terminal 1 permitted to access the cell 21 on the white list in the initial state. For example, when the core network apparatus 10 determines, according to notification from the base station 20, to prohibit the terminal 1 from making access in the cell 21, the core network apparatus 10 can notify the base station 20 to that effect by changing, in the access control update information shown in FIGS. 4 to 6, the "number of access-permitted terminals" and the "access-permitted terminals" shown in the information elements respectively to "number of access-prohibited terminals" and "access-prohibited terminals". In this case, the terminal 1 recognizes, through any one of the methods (1) to (3) explained above, that access to the cell 21 is prohibited. After deleting the cell 21 from the white list included in the terminal 1, the terminal 1 changes to the out-of-communication-range state.

As explained above, in this embodiment, when a terminal that is present in a CSG cell to which access is not permitted in a white list of the terminal and is out of range is permitted to access the CSG cell, the core network apparatus transmits access control update information to the base station. The base station generates a CSG cell white list based on the access control update information and transmits the CSG cell white list in the cell in a broadcast manner as notification information of the CSG cell. Therefore, the out-of-range terminal can recognize that the terminal is permitted to access the CSG cell. Consequently, even when a terminal, access authority of which to a CSG cell is to be changed, is out of range in the CSG cell and communication cannot be established between the core network apparatus and the terminal, the terminal can change a white list and make a connection to the core network apparatus through the base station.

When the terminal 2 determines that access to the cell 21 is permitted based on the CSG cell white list and performs position registration between the terminal 2 and the core network apparatus 10 through the base station 20, the white lists can be synchronized between the terminal 2 and the core network apparatus 10.

The core network apparatus 10 transmits the access control update information to the base stations. The base stations generate CSG cell white lists that should be notified in the CSG cells. However, the core network apparatus 10 and the base stations are not limited to this. For example, the core network apparatus 10 can generate CSG cell white lists that should be notified in the CSG cells and notify the base stations of the CSG cell white lists. The base stations can directly notify the received CSG cell white lists.

Identifiers of terminals notified as CSG cell white lists are the identifiers themselves of the terminals. However, the identifiers are not limited to this. Scramble processing or the like can be applied to the identifiers using information peculiar to the terminals to improve security. For example, a random sequence number N that periodically changes is subjected to the scramble processing using an identifier I peculiar to a terminal such as IMSI (International Mobile Subscriber Identity) to obtain s(N, I). Further, CRC (Cyclic Redundancy Check) is added to s(N, I) to obtain s(N, I)|CRC(s(N, I)), which is set as a terminal identifier in a CSG cell white list. A terminal on a reception side descrambles the part s(N, I) other than the CRC using an identifier I' of the terminal to obtain S(s(N, I), I') and further calculates CRC to obtain CRC(S(s(N, I), I'). The terminal compares CRC(S(s(N, I), I') with received CRC(s(N, I)). In the case of I=I', because S(s(N, I), I')=s(N, I), CRC of CRC(S(s(N, I), I') and CRC of CRC(s(N, I)) coincide with each other. The terminal can determine that the terminal identifier is a terminal identifier of the terminal.

Second Embodiment

In this embodiment, a terminal is called by paging and a change in access control is notified to the terminal. Differences from the first embodiment are explained.

As an initial state, the configuration of a cellular system and white lists of apparatuses are the same as those in the first embodiment. Specifically, in the cell 21, the terminal 1 is in a communicable state and the terminals 2 and 3 are in an uncommunicable state. In the first embodiment, the terminals 2 and 3 are in a state same as a state in which the terminals 2 and 3 are out of communication range. Communication is impossible between the core network apparatus 10 and the terminals 2 and 3. In this embodiment, when another accessible cell is not found, the terminals 2 and 3 change to a quasi-waiting state in the cell 21. In the quasi-waiting state, the terminals 2 and 3 do not perform position registration and origination and wait for only a paging message.

For example, the core network apparatus 10 receives notification from the base station 20. When the core network apparatus 10 determines to temporarily permit the terminal 2 to make access in the cell 21, the core network apparatus 10 rewrites the white list of the core network apparatus 10 as shown in FIG. 3, transmits a paging message to the cell 21 through the base station 20, and calls the terminal 2. The terminals 2 and 3 wait for a paging message transmitted from the cell 21. Both the terminals 2 and 3 receive the paging message. However, because only the identifier of the terminal 2 is included in the paging message, only the terminal 2 responds to paging and makes a connection to the core network apparatus 10 through the base station 20 included in the cell 21.

The core network apparatus 10 and the terminal 2 update contents of the white lists using the established connection through the base station 20. Therefore, the terminal 2 can also rewrite the contents of the white list of the terminal 2 (add the cell 21). Consequently, as in the first embodiment, the terminal 2 can access the cell 21 as a terminal temporarily permitted to make access. The terminal 2 can communicate with the core network apparatus 10 through the base station 20. A method of prohibiting access of the terminal 2 temporarily permitted to make access is the same as that in the first embodiment.

As explained above, in this embodiment, when a terminal temporarily permitted to make access is present in a CSG cell but the CSG cell is not registered in a white list of the terminal, as a quasi-waiting state, the terminal is allowed to receive a paging message from the CSG cell. Consequently, when the core network apparatus desires to change access authority to a CSG cell, the core network apparatus calls a target terminal and, after making a connection to the terminal through a base station, updates white lists of the core network apparatus and the terminal. In this way, the core network apparatus can allow the terminal to access the CSG cell.

Figure 7:
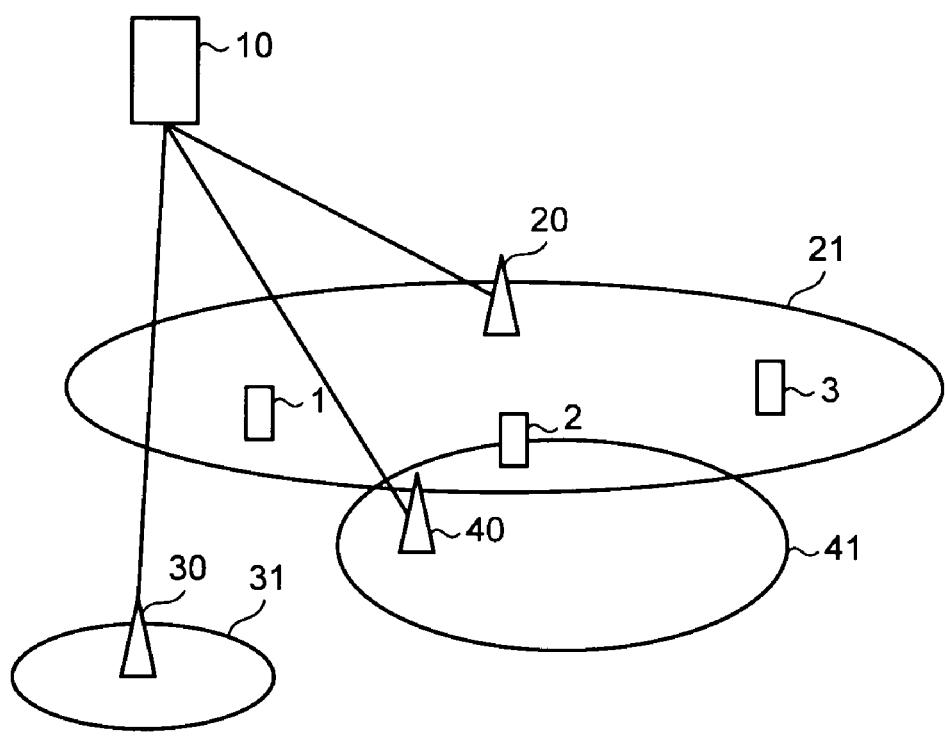
FIG. 7 is a diagram of a configuration example of a cellular system.

The core network apparatus 10 transmits paging only to the cell 21 through the base station 20. However, the core network apparatus 10 is not limited to this. The core network apparatus 10 can transmit paging to a plurality of cells located around a target cell to which access is permitted. FIG. 7 is a diagram of a configuration example of a cellular system. The cellular system is different from that shown in FIG. 1 in that the cellular system includes a base station 40. A cell 41 indicates a communicable area in the base station 40.

For example, as shown in FIG. 7, when both a radio wave from the base station 20 and a radio wave from the base station 40 reach the terminal 2, it is likely that the terminal 2 is in a quasi-waiting state in the cell 41 and does not receive a paging message transmitted to the cell 21. Therefore, the core network apparatus 10 transmits a paging message to both the cell 21 and the cell 41, which is a peripheral cell of the cell 21. Consequently, even when the terminal 2 is in the quasi-waiting state in the cell 41, the terminal 2 can make a connection to the core network apparatus 10 through the base station 40 in response to paging from the cell 41 and rewrite contents of a white list. Thereafter, the terminal 2 changes to a communicable state in the cell 21 based on the updated white list.

When the terminal 2 is in a quasi-waiting state in the cell 21, the terminal 2 does not perform position registration between the terminal 2 and the core network apparatus 10 through the base station 20. However, the terminal 2 is not limited to this. The terminal 2 can perform, even in the quasi-waiting state, position registration from a cell to which access is not permitted. The terminal 2 in the quasi-waiting state performs position registration between the terminal 2 and the core network apparatus 10 through a base station included in the cell to which access is not permitted. Consequently, the core network apparatus 10 can grasp in which cell the terminal 2 is present. When the core network apparatus 10 changes access authority, the core network apparatus 10 can limit cells to which a paging message is transmitted.

For example, in a cellular system shown in FIG. 7, when the terminal 2 is in a quasi-waiting state in the cell 41, the terminal 2 performs position registration between the terminal 2 and the core network apparatus 10 through the base station 40 included in the cell 41, whereby the core network apparatus 10 recognizes that the terminal 2 is present in the cell 41. When core network apparatus 10 permits the terminal 2 to access the cell 21, the core network apparatus 10 transmits a paging message to the cell 41 and calls the terminal 2. After making connection to the core network apparatus 10 through the base station 40 in response to paging from the cell 41, the terminal 2 can rewrite a white list. The terminal 2 changes to a communicable state in the cell 21 based on the updated white list.

When a terminal in a quasi-waiting state performs, through a base station, position registration between the terminal and the core network apparatus 10 from a cell to which access is not permitted, the terminal can reduce a frequency of periodical position registration to be lower than a normal frequency such that a radio resource of the cell can be preferentially used in a terminal originally permitted to use the radio resource. In other words, the terminal reduces a transmission frequency of a position registration message transmitted from the terminal. In this case, an indicator indicating that position registration is position registration from the cell to which access is not permitted can be provided in the position registration message, whereby the core network apparatus 10 can recognize that the terminal is in the quasi-waiting state and a period of the periodical position registration is longer than usual.

When a terminal in a quasi-waiting state performs, through a base station, position registration between the terminal and the core network apparatus 10 from a cell to which access is not permitted, if a white list is already changed at the time of the position registration, the white list can be updated in a procedure of the position registration. Consequently, it is possible to make improvement not to wastefully use a radio resource in a cell to which access is not originally permitted.

INDUSTRIAL APPLICABILITY

As explained above, the access authority changing method according to the present invention is useful for a cellular system of the 3GPP and is, in particular, suitable for a cellular system having a cell to which access can be limited.

REFERENCE SIGNS LIST

1, 2, 3 terminals
10 core network apparatus
20, 30, 40 base stations
21, 31, 41 cells

The invention claimed is:

1. An access authority changing method in a cellular system including at least one terminal, a core network apparatus, and a base station included in a cell to which only a terminal permitted to make access can be connected, the core network apparatus storing a first list, which is a white list obtained by listing cells accessible by terminals, and the terminals storing a second list, which is a white list obtained by listing cells to which the terminals can access, the access authority changing method comprising:

the base station notifying the core network apparatus that the base station permits access of a predetermined terminal not permitted to access a cell of the base station;

the core network apparatus, which receives the notification, adding a cell of the base station to the first list as a cell to which the predetermined terminal can access;

the core network apparatus transmitting the first list added with the cell to the base station;

the base station transmitting the first list received from the core network apparatus to the cell in a broadcast manner; and the predetermined terminal adding, based on contents of the first list received from the base station, a cell of the base station to the second list, accessing the cell, and starting communication with the core network apparatus.

2. The access authority changing method according to claim 1, wherein the transmitting the first list includes the base station scrambling an identifier indicating a terminal and transmitting the identifier in a broadcast manner.

3. An access authority changing method in a cellular system including at least one terminal, a core network apparatus, and a base station included in a cell to which only a terminal permitted to make access can be connected, the core network apparatus storing a first list, which is a white list obtained by listing cells accessible by terminals, and the terminals storing a second list, which is a white list obtained by listing cells to which the terminals can access, the access authority changing method comprising:

the base station notifying the core network apparatus that the base station permits access of a predetermined terminal not permitted to access a cell of the base station;

the core network apparatus, which receives the notification, adding a cell of the base station to the first list as a cell to which the predetermined terminal can access;

the core network apparatus calling the predetermined terminal by paging through the base station;

the predetermined terminal establishing, in response to the paging, a communication connection between the predetermined terminal and the core network apparatus through the base station and starting communication;

the core network apparatus transmitting the first list added with the cell to the predetermined terminal through the base station; and the predetermined terminal adding, based on contents of the received first list, a cell of the base station to the second list.

4. The access authority changing method according to claim 3, wherein the calling the predetermined terminal includes the core network apparatus transmitting a paging message to the cell added to the first list.

5. The access authority changing method according to claim 3, the calling the predetermined terminal includes the core network apparatus transmitting a paging message to the cell added to the first list and a cell around the cell.

6. The access authority changing method according to claim 3, further comprising, when a terminal present in a cell to which access is not permitted can perform position registration between the terminal and the core network apparatus through a base station included in the cell, performing, between the predetermined terminal and the core network apparatus, position registration through the base station included in the cell to which access is not permitted, wherein
the calling the predetermined terminal includes the core network apparatus transmitting a paging message to a cell in which the predetermined terminal that performs the position registration is present.

7. The access authority changing method according to claim 6, wherein the performing position registration includes the predetermined terminal transmitting a position registration message at a frequency lower than a frequency in performing the position registration from a cell to which access is permitted.

8. The access authority changing method according to claim 6, wherein the performing position registration includes:
the core network apparatus notifying, in performing position registration between the core network apparatus and the predetermined terminal, when there is a change in contents concerning the terminal in the first list, the terminal of the changed contents through the base station; and
the terminal, which receives the notification, changing contents of the second list based on the changed contents of the first list.

9. A terminal in a cellular system including at least one terminal, a core network apparatus, and a base station included in a cell to which only a terminal permitted to make access can be connected, the core network apparatus storing a first list, which is a white list obtained by listing cells accessible by terminals, and the terminals storing a second list, which is a white list obtained by listing cells to which the terminals can access, wherein the base station notifies the core network apparatus that access of a predetermined terminal not permitted to access a cell of the base station, and wherein the terminal adds a cell of the base station to the second list based on contents of the first list received from the base station.

10. The terminal according to claim 9, wherein, when the terminal is present in a cell to which access is not permitted, the terminal performs position registration between the terminal and the core network apparatus through a base station included in the cell to which access is not permitted.

11. The terminal according to claim 10, wherein the terminal transmits a position registration message at a frequency lower than a frequency in performing the position registration from a cell to which access is permitted.

12. The terminal according to claim 10, wherein, in performing the position registration between the terminal and the core network apparatus through the base station, when the terminal receives notification of changed contents of the first list from the core network apparatus through the base station, the terminal changes contents of the second list based on the changed contents of the first list.

* * * * *